US012455975B2

(12) United States Patent
Bidkar et al.

(10) Patent No.: US 12,455,975 B2
(45) Date of Patent: Oct. 28, 2025

(54) SYSTEM AND METHOD FOR SECURE DOCUMENT RETRIEVAL AND SHARING USING MULTISTAGE ENCRYPTION AND AUTHORIZATION

(71) Applicant: BANK OF AMERICA CORPORATION, Charlotte, NC (US)

(72) Inventors: Prashant Anna Bidkar, Delhi (IN); Ranjan Verma, Haryana (IN); Krishnan T R, New Delhi (IN); Prashant Khare, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 288 days.

(21) Appl. No.: 18/103,926

(22) Filed: Jan. 31, 2023

(65) Prior Publication Data
US 2024/0256687 A1 Aug. 1, 2024

(51) Int. Cl.
*G06F 21/62* (2013.01)

(52) U.S. Cl.
CPC ...... *G06F 21/6209* (2013.01); *G06F 21/6245* (2013.01); *G06F 2221/2107* (2013.01)

(58) Field of Classification Search
CPC ............. G06F 21/6209; G06F 21/6245; G06F 2221/2107
USPC ........................................................ 713/193
See application file for complete search history.

(56) References Cited

U.S. PATENT DOCUMENTS

| | | | |
|---|---|---|---|
| 6,845,908 B2 | 1/2005 | Morita | |
| 7,103,915 B2 * | 9/2006 | Redlich | G06F 21/6209 713/193 |
| 7,606,769 B2 | 10/2009 | Yeung | |
| 7,620,177 B2 | 11/2009 | Ibrahim | |
| 7,970,143 B2 | 6/2011 | Vennelakanti | |
| 8,375,206 B2 | 2/2013 | Asano | |
| 8,589,696 B2 | 11/2013 | Atherton | |
| 8,667,269 B2 | 3/2014 | Schibuk | |
| 8,719,954 B2 | 5/2014 | Sitrick | |
| 8,824,835 B2 | 9/2014 | Piersol | |

(Continued)

OTHER PUBLICATIONS

NPL Search Terms (Year: 2025).*

(Continued)

*Primary Examiner* — Syed A Zaidi
(74) *Attorney, Agent, or Firm* — Moore & Van Allen PLLC; Nicholas C. Russell (57) ABSTRACT

Systems, computer program products, and methods are described herein for secure document retrieval and sharing using multistage encryption and authorization. The method includes receiving a user location verification request for an account associated with a user. The user location verification request is for one or more documents relating a user residence. The method includes receiving at least one encryption key for document(s) associated with the user. The document(s) associated with the user relate to the user residence of the user. The method also includes causing a transmission of at least one encryption key used to access document(s) associated with the account. The method further includes determining the user residence of the user based on the document(s) obtained via the at least one encryption key. The method still further includes determining an account access level for the account associated with the user based on the user residence.

17 Claims, 6 Drawing Sheets

(56) References Cited

U.S. PATENT DOCUMENTS

| | | |
|---|---|---|
| 9,210,133 B2 | 12/2015 | Yau |
| 9,521,123 B2 | 12/2016 | Jueneman |
| 9,544,135 B2 | 1/2017 | Andoni |
| 9,679,118 B2 | 6/2017 | Sitrick |
| 10,263,776 B2* | 4/2019 | Kuris .................. H04L 9/0897 |
| 10,848,318 B2 | 11/2020 | Uhr |
| 11,070,535 B2 | 7/2021 | Basin |
| 2003/0051054 A1* | 3/2003 | Redlich .................. H04L 63/20 709/206 |
| 2007/0055672 A1* | 3/2007 | Stevens ................ H04L 63/107 |
| 2007/0201721 A1 | 8/2007 | Malone |
| 2008/0126808 A1 | 5/2008 | Price |
| 2010/0138667 A1 | 6/2010 | Adams |
| 2012/0072730 A1 | 3/2012 | Winograd |
| 2015/0052594 A1* | 2/2015 | Liberman ........... H04L 63/0861 726/6 |
| 2015/0348185 A1* | 12/2015 | Frost ...................... G06Q 40/02 705/35 |
| 2016/0357972 A1* | 12/2016 | Stuntebeck ............. G06F 16/16 |
| 2017/0249471 A1 | 8/2017 | Bond |
| 2018/0204204 A1* | 7/2018 | Giraudo ............... G06Q 10/083 |
| 2019/0005470 A1 | 1/2019 | Uhr |
| 2019/0013942 A1* | 1/2019 | Brown .................. H04L 9/3226 |
| 2019/0237170 A1* | 8/2019 | Okajima ............. G06F 21/6209 |
| 2019/0311148 A1 | 10/2019 | Andrade |
| 2019/0377889 A1 | 12/2019 | Mertens |
| 2023/0087623 A1* | 3/2023 | Lu .......................... G06N 20/00 705/7.29 |

OTHER PUBLICATIONS

Kuang, Liwei, et al. "Secure tensor decomposition for big data using transparent computing paradigm." IEEE Transactions on Computers 68.4 (2018): 585-596. (Year: 2018).*

* cited by examiner

SYSTEM AND METHOD FOR SECURE DOCUMENT RETRIEVAL AND SHARING USING MULTISTAGE ENCRYPTION AND AUTHORIZATION

TECHNOLOGICAL FIELD

Example embodiments of the present disclosure relate generally to document retrieval and sharing and, more particularly, to secure document retrieval and sharing using multistage encryption and authorization.

BACKGROUND

User residence information can change over time and can be difficult to track. However, user location and residence information can be required to be accurate in order to adhere to government regulations. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for secure document retrieval and sharing using multistage encryption and authorization is provided. The system includes at least one non-transitory storage device and at least one processing device coupled to the at least one non-transitory storage device. The at least one processing device is configured to receive a user location verification request for an account associated with a user. The user location verification request is a request for one or more documents relating a user residence of the user. The at least one processing device is also configured to receive at least one encryption key for one or more documents associated with the user. The one or more documents associated with the user relate to the user residence of the user. The at least one processing device is further configured to cause a transmission of at least one encryption key relating to the user. The at least one encryption key is used to access one or more documents associated with the account associated with the user. The at least one processing device is still further configured to determine the user residence of the user based on the one or more documents obtained via the at least one encryption key relating to the user. The at least one processing device is also configured to determine an account access level for the account associated with the user based on the user residence of the user. The account access level is a restriction of access in an instance in which the user residence is a restricted location.

In various embodiments, the restricted location is based on one or more sanctioned countries that are restricted from a network. In various embodiments, the at least one encryption key is used to decrypt at least the one or more documents and the one or more documents are encrypted using at least one of a non-fungible token hash encryption, a cipher chain encryption, or a tensor encryption. In various embodiments, the one or more documents are encrypted using at least two of a non-fungible token hash encryption, a cipher chain encryption, or a tensor encryption.

In various embodiments, the one or more documents associated with the user relating to the user residence of the user are government-issued documents relating to user location. In various embodiments, the user location verification request is created periodically for confirmation of the user residence and the user residence is verified on a periodic basis.

In various embodiments, the at least one processing device is further configured to encrypt the one or more documents associated with the user with the encryption being based on the user associated with the given document and store the one or more encrypted documents in a centralized storage.

In another example embodiment, a computer program product for secure document retrieval and sharing using multistage encryption and authorization is provided. The computer program product includes at least one non-transitory computer-readable medium having computer-readable program code portions embodied therein. The computer-readable program code portions include an executable portion configured to receive a user location verification request for an account associated with a user. The user location verification request is a request for one or more documents relating a user residence of the user. The computer-readable program code portions also include an executable portion configured to receive at least one encryption key for one or more documents associated with the user. The one or more documents associated with the user relate to the user residence of the user. The computer-readable program code portions further include an executable portion configured to cause a transmission of at least one encryption key relating to the user. The at least one encryption key is used to access one or more documents associated with the account associated with the user. The computer-readable program code portions still further include an executable portion configured to determine the user residence of the user based on the one or more documents obtained via the at least one encryption key relating to the user. The computer-readable program code portions also include an executable portion configured to determine an account access level for the account associated with the user based on the user residence of the user. The account access level is a restriction of access in an instance in which the user residence is a restricted location.

In various embodiments, the restricted location is based on one or more sanctioned countries that are restricted from a network. In various embodiments, the at least one encryption key is used to decrypt at least the one or more documents and the one or more documents are encrypted using at least one of a non-fungible token hash encryption, a cipher chain encryption, or a tensor encryption. In various embodiments, the one or more documents are encrypted using at least two of a non-fungible token hash encryption, a cipher chain encryption, or a tensor encryption.

In various embodiments, the one or more documents associated with the user relating to the user residence of the user are government-issued documents relating to user location. In various embodiments, the user location verification request is created periodically for confirmation of the user residence and the user residence is verified on a periodic basis.

In various embodiments, the computer program product also includes an executable portion configured to encrypt the one or more documents associated with the user with the encryption being based on the user associated with the given document and an executable portion configured to store the one or more encrypted documents in a centralized storage.

In another example embodiment, a computer-implemented method for secure document retrieval and sharing using multistage encryption and authorization is provided. The method includes receiving a user location verification request for an account associated with a user. The user location verification request is a request for one or more documents relating a user residence of the user. The method also includes receiving at least one encryption key for one or more documents associated with the user. The one or more documents associated with the user relate to the user residence of the user. The method further includes causing a transmission of at least one encryption key relating to the user. The at least one encryption key is used to access one or more documents associated with the account associated with the user. The method still further includes determining the user residence of the user based on the one or more documents obtained via the at least one encryption key relating to the user. The method also includes determining an account access level for the account associated with the user based on the user residence of the user. The account access level is a restriction of access in an instance in which the user residence is a restricted location.

In various embodiments, the restricted location is based on one or more sanctioned countries that are restricted from a network. In various embodiments, the at least one encryption key is used to decrypt at least the one or more documents and the one or more documents are encrypted using at least one of a non-fungible token hash encryption, a cipher chain encryption, or a tensor encryption. In various embodiments, the one or more documents are encrypted using at least two of a non-fungible token hash encryption, a cipher chain encryption, or a tensor encryption.

In various embodiments, the user location verification request is created periodically for confirmation of the user residence and the user residence is verified on a periodic basis. In various embodiments, the method also includes encrypting the one or more documents associated with the user with the encryption being based on the user associated with the given document and storing the one or more encrypted documents in a centralized storage.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

The residence of a user may need to be routinely verified to confirm adherence to government regulations. Some countries limit or completely prohibit network access or service for users residing in specific countries, such as international sanctioned countries. Users from these countries may be allowed to maintain network access or services while residing in other countries and therefore, a user's residence needs to be routinely monitored. However, such monitoring can be difficult and cumbersome as it often relies on the user having to provide the resident documents on a periodic basis.

Various embodiments of the present disclosure allow for secure document retrieval and sharing using multistage encryption and authorization. An environment of various embodiments provides a centralized storage device that is in communication with one or more document sources that can provide documents relating to a user. The document sources, for example, may be government entities that monitor resident information for some or all residents. These document sources provide documents for one or more users to the centralized storage device. Said documents are encrypted using at least one of a non-fungible token hash encryption, a cipher chain encryption, or a tensor encryption. The user is provided with one or more encryption keys that can be provided to participating entities to allow the participating entity to access and/or retrieve relevant documents using the encryption keys. The system is capable of periodically confirming the residence of the user using the encryption key.

The present disclosure provides a solution to issues relating to secure storage and transmission of confidential and/or classified documents. Namely, various embodiments of the present disclosure provide for an automated method of obtaining, encrypting, storing, and retrieving document(s) relating to a residence of a user for use in confirming user access eligibility.

Figure 1A:
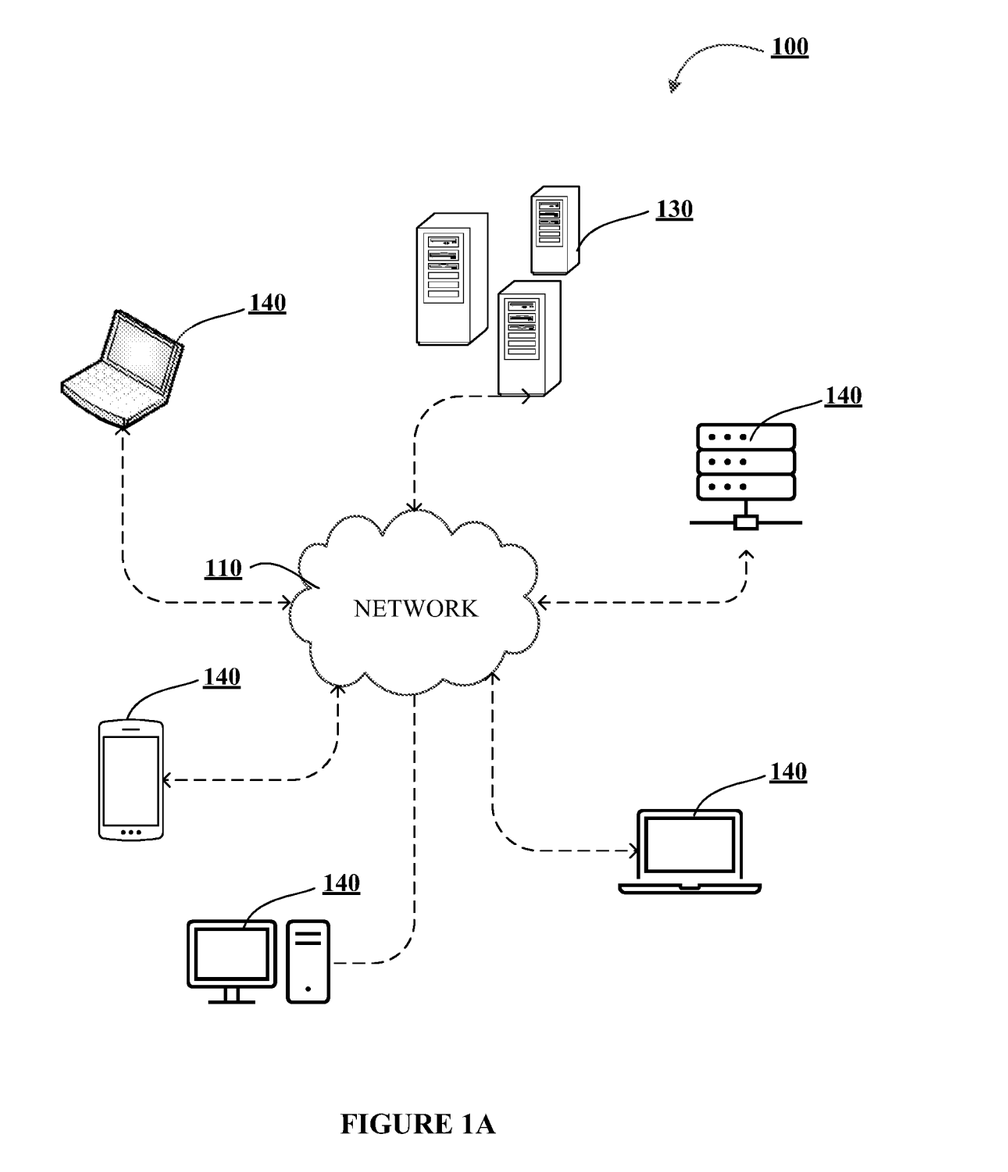
FIGS. 1A-1C illustrates technical components of an exemplary distributed computing environment for secure document retrieval and sharing using multistage encryption and authorization, in accordance with various embodiments of the present disclosure.
Figure 1B:
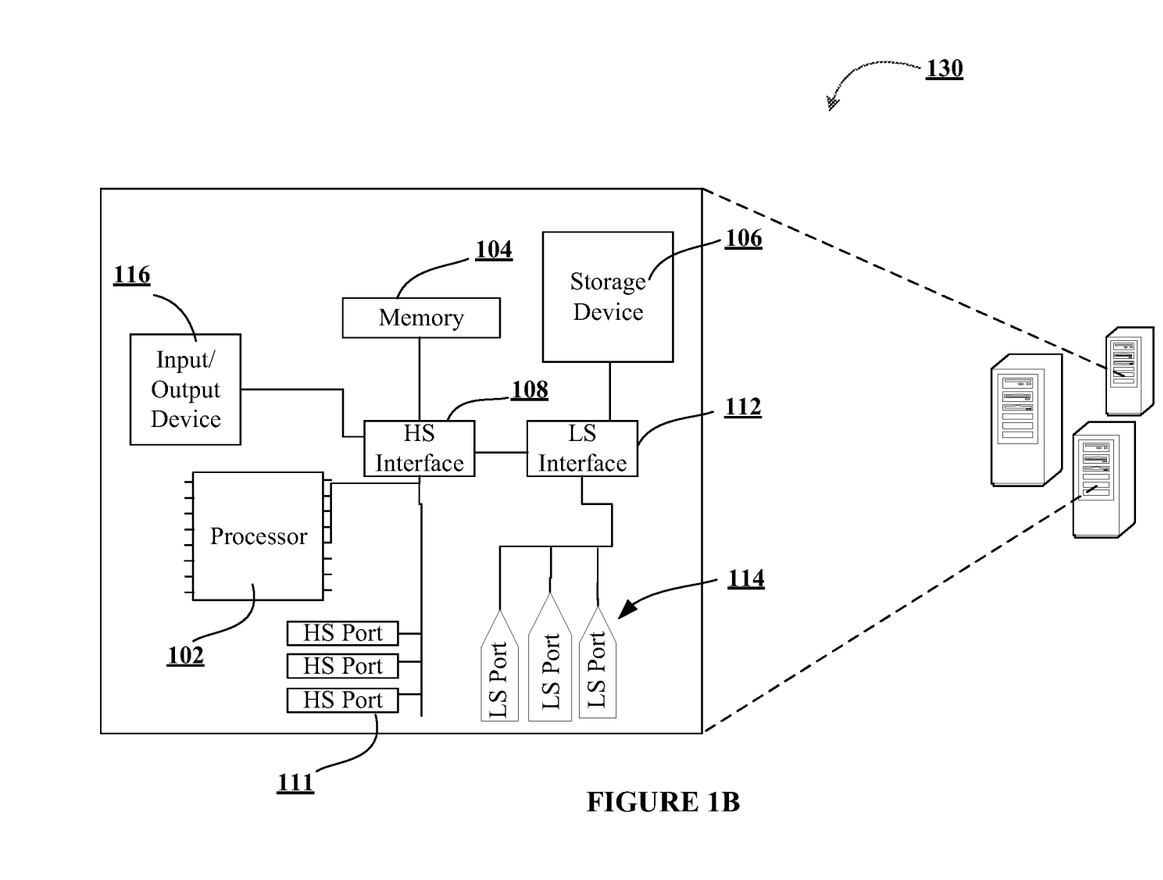
Figure 1C:
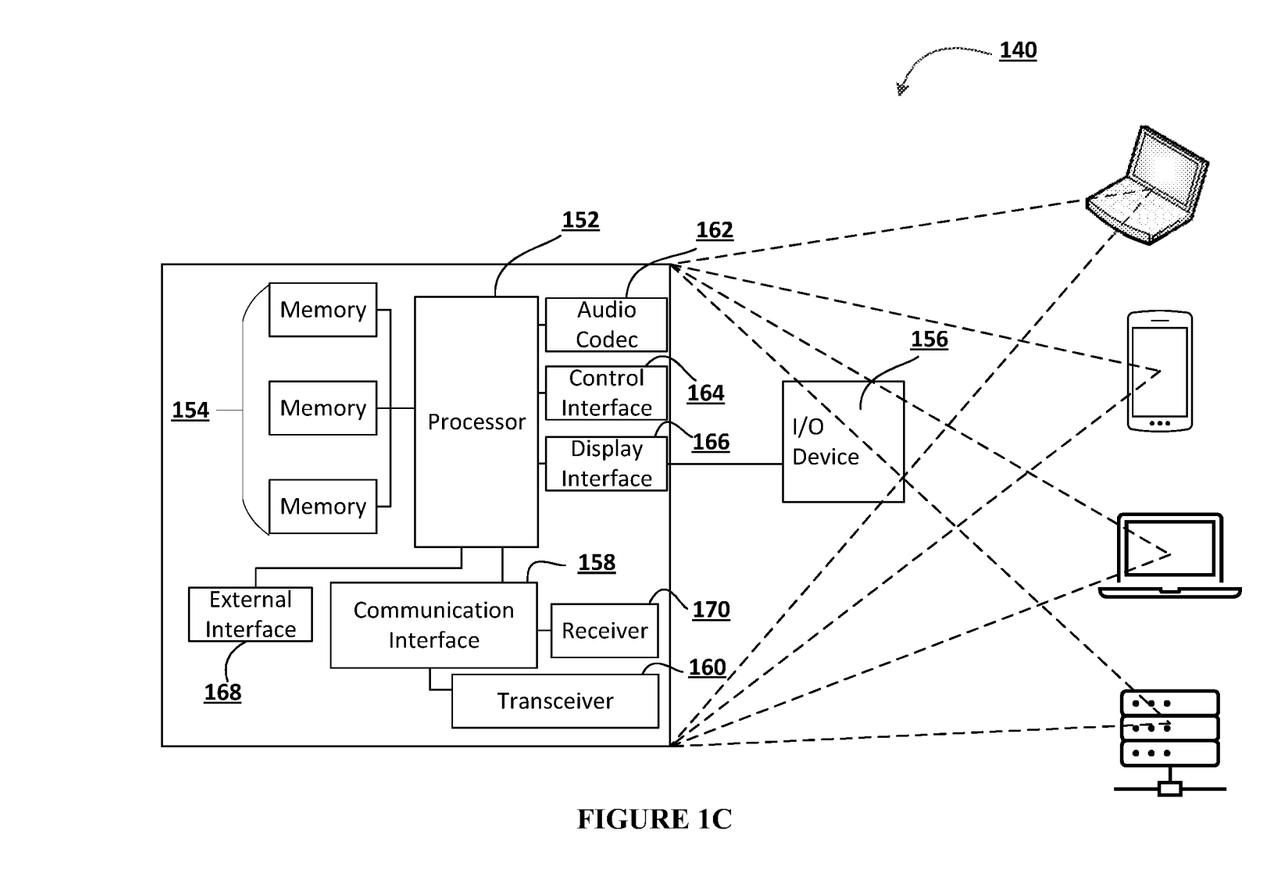

FIGS. 1A-1C illustrate technical components of an exemplary distributed computing environment for secure document retrieval and sharing using multistage encryption and authorization, in accordance with various embodiments of the disclosure. As shown in FIG. 1A, the distributed computing environment 100 contemplated herein may include a system 130 (e.g., an encryption/decryption document storage and retrieval device), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
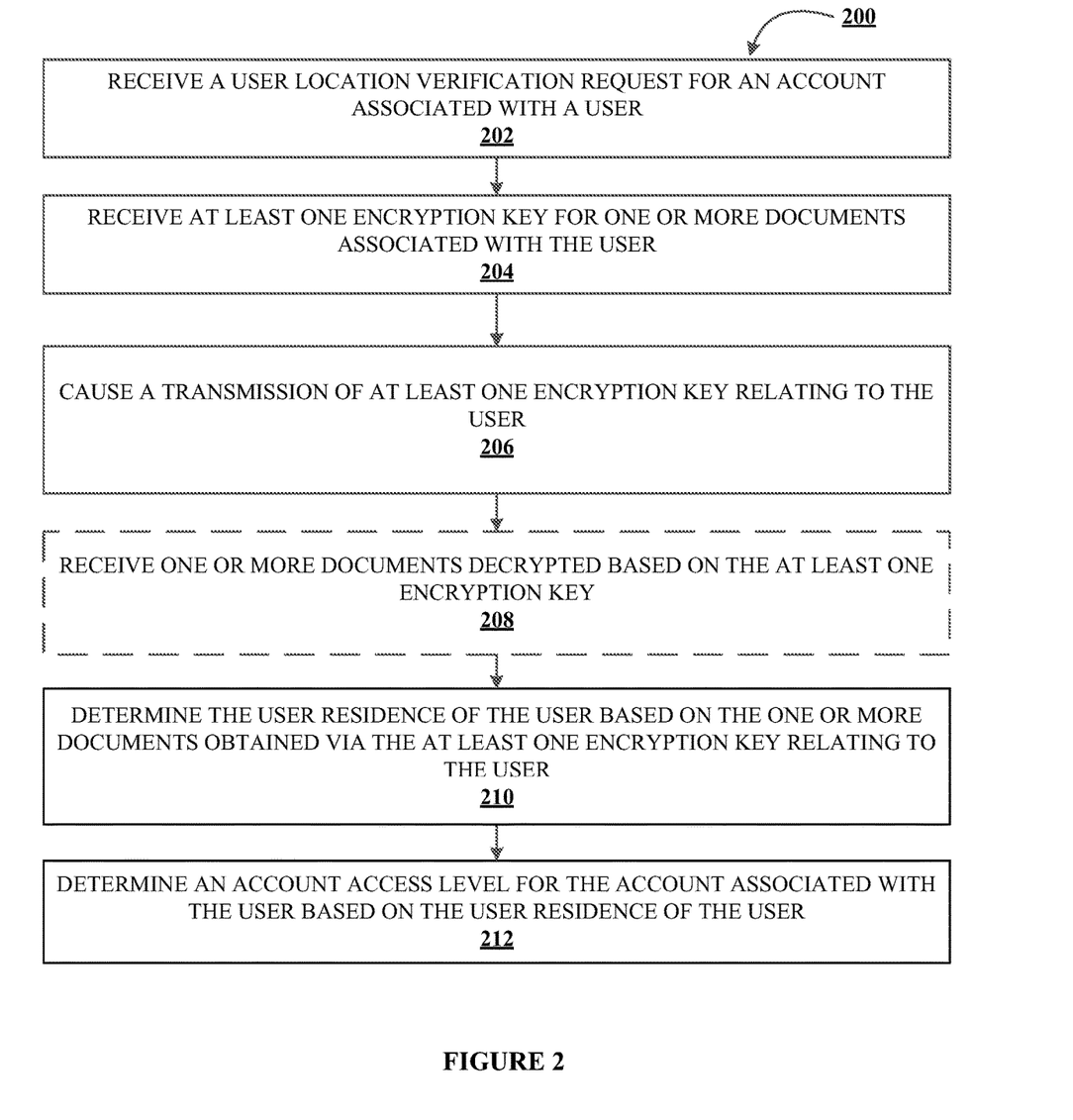
FIG. 2 illustrates a process flow for secure document retrieval and sharing using multistage encryption and authorization, in accordance with various embodiments of the present disclosure.

FIG. 2 is a flow chart 200 that illustrates an example method of secure document retrieval and sharing using multistage encryption and authorization. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes receiving a user location verification request for an account associated with a user. The user location verification request may be request for one or more documents relating a user residence of the user. The request may be in response to a user providing information to an entity (e.g., starting an account with a financial institution). Additionally or alternatively, the user location verification request may be a part of a periodic residence confirmation for one or more users. For example, users from a restricted location may be monitored periodically to confirm that said user is not in the restricted location. A restricted location may be any location in which access may be limited. Examples of restricted locations include areas in which access is forbidden (e.g., a sanctioned country may be a restricted location), areas in which an entity does not operate (e.g., an entity may require a user to reside in a certain state, country, or area), and/or the like. A restricted area may be any location in which an entity wishes to restrict access.

The one or more documents associated with the user relating to the user residence of the user may be government-issued documents relating to user location. For example, government entities may provide a person residing therein with documentation that confirms such residence. Such government issued documents may be generated and/or reviewed periodically (e.g., a residence form may be valid for one or two years). Therefore, the user location verification request timing may be based on the amount of time such documents are valid (e.g., a new user location verification request may be generated in an instance in which the previous document has expired). The timing of the user location verification request may also be based on government regulations (e.g., a government may require verification of user residence yearly). Therefore, the user location verification request may be created periodically for confirmation of the user residence allowing for the user residence to be verified on a periodic basis.

Referring now to Block 204 of FIG. 2, the method includes receiving at least one encryption key for one or more documents associated with the user. As discussed below in reference to Block 206 of FIG. 2, as well as Blocks 302 and 304 of FIG. 3, the encryption key is based on the type of encryption used. Each encryption key may be associated with a specific user and/or account associated with the user. The at least one encryption key may be received from the user. The system may receive at least one encryption key in response to a request from the system (e.g., the user may be prompted to provide one or more encryption keys).

The type of encryption key may be based on the type of encryption used for documents. In some embodiments, the documents may have multiple encryption keys based on the amount of encryption methods used for the encryption. For example, in an instance in which the system uses three different methods of encryption, three encryption keys may be necessary to decrypt the encryption. In some embodiments, multiple encryption keys may be used for the same type of encryption. For example, a cipher chain may be generated with multiple encryption keys necessary to decrypt the cipher chain.

Referring now to Block 206 of FIG. 2, the method includes causing a transmission of at least one encryption key relating to the user. The system may use the encryption key(s) to decrypt the one or more documents. In such an instance, each of the encryption key(s) must match the encryption key(s) for the document(s), otherwise the documents will not be provided to the requesting entity. As discussed in more detail below in reference to FIG. 3, the type of encryption key may be based on the encryption method used. Additionally, multiple encryption keys may be used in an instance in which multiple encryption methods are used. The encryption key(s) may be any passcode to be used to decrypt an encrypted file. For example, the encryption key may be one or more alphanumerical characters, one or more words, one or more sets of numbers, and/or the like.

Referring now to optional Block 208 of FIG. 2, the method includes receiving one or more documents decrypted based on the at least one encryption key. As discussed in more detail in reference to FIG. 4, the documents may be received from a centralized storage device. In an example embodiment, the centralized storage device may receive the encryption key(s) and use the encryption key(s) to decrypt the relevant documents associated with user. In some instances, the document(s) may be transmitted to the requesting entity. Additionally or alternatively, information from the documents may be provided (e.g., the entity may receive an indication of the user residence, but not the document itself).

Referring now to Block 210 of FIG. 2, the method includes determining the user residence of the user based on the one or more documents obtained via the at least one encryption key relating to the user. The user residence may be confirmed based on the document(s). For example, the United States government may provide a document confirming that a user resides in the United States. The user residence may be manually confirmed by the entity (e.g., a user of the entity system may review the document and provide an input of the user residence).

In some instances, the determination of the user residence may be automated (e.g., Optical character recognition (OCR) technology and/or other types of data processing technology may be used to extract the user residence from one or more documents). The system may also confirm information in the document corresponds to the user in which the user residence is being determined (e.g., the system may confirm that the information about the user listed on the document(s) (e.g., name, date of birth, physical characteristics, and/or the like) matches information relating to user being verified). The system may also determine whether the document is still valid (e.g., for regulations, a document may have to have been issued within a given amount of time).

Referring now to Block 212 of FIG. 2, the method includes determining an account access level for the account associated with the user based on the user residence of the user. The account access level is based on whether the user residence is within a restricted location. In an instance in which the user residence is not within a restricted location, the account access level would be the usual user access level (e.g., whatever the type of account the user is assigned). In an instance in which the user residence is within a restricted location, the account access of the user may be partially or completely restricted. For example, residents of some restricted areas may not be able to receive certain functions or features of the account, while residents of some restricted locations may not be capable of having an account at all (e.g., a financial institution may not be allowed to have any users residing in a sanctioned country and any such accounts will be cancelled). In some instances, the operations herein may be combined with geo-tracking to cross-reference a user residence (e.g., a resident of the United States most often will be located in the United States). Other residence verification may be combined with the operations discussed herein.

Figure 3:
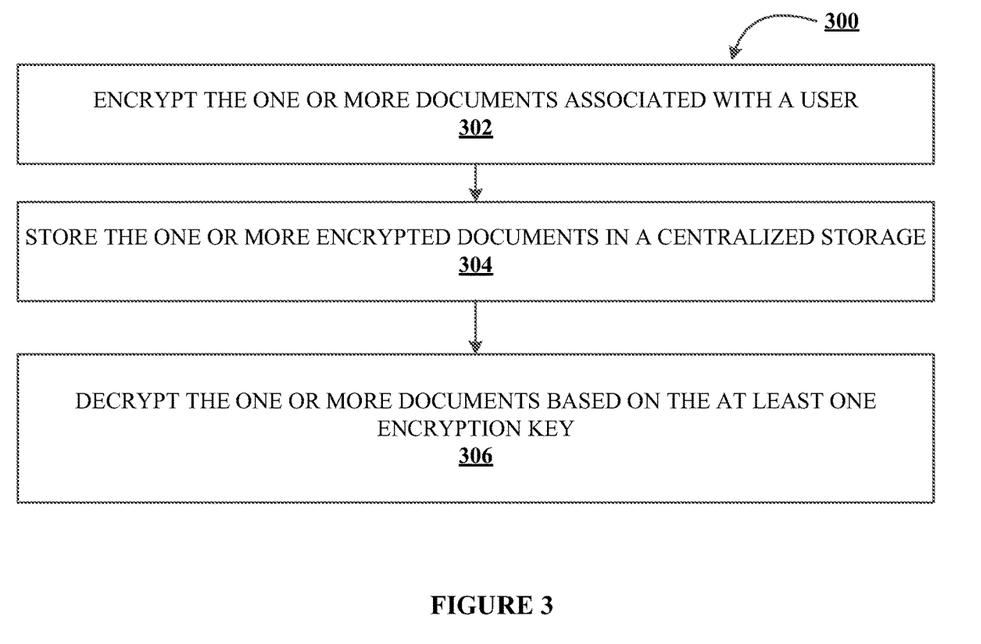
FIG. 3 illustrates a process flow for encrypting and decrypting documents for retrieval and sharing, in accordance with various embodiments of the present disclosure.

FIG. 3 is a flow chart 300 that illustrates an example method of secure document retrieval and sharing using multistage encryption and authorization. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

The method shown in the flow chart 300 may be used in combination or independent from the flow chart 200 of FIG. 2. For example, the system may be configured to receive the one or more documents associated with the user and then encrypt and store said documents until receiving the at least one encryption key discussed in reference to Block 206 of FIG. 2 above. The operations of the flow chart 200 and flow chart 300 may be carried out by the same system 130 or similar systems 130 in communication with one another (e.g., a storage system may encrypt and store the documents, while an access system may carry out the operations of flow chart 2 in communication with the storage system).

Referring now to Block 302 of FIG. 3, the method includes encrypting the one or more documents associated with a user. In various embodiments, the encryption of the one or more documents may be completed on a user level (e.g., documents associated with different users are assigned different encrypted files, such that the encryption key(s) relate to one or more documents associated with a specific user).

In various embodiments, the system may have one or more types of encryptions for each of the documents. The types of encryptions discussed herein are not exhaustive and other encryption methods may be used in addition to or in place of the encryption methods discussed herein. Additionally, in various embodiments, one or more encryption types may be used (e.g., in some embodiments, a single encryption type may be used, while in other embodiments, multiple encryption types may be used for the same document(s)).

In various embodiments, the document(s) associated with a user may be stored as a non-fungible token ("NFT") and use a hash encryption to encrypt the non-fungible token. The non-fungible token may be fractional, such that the non-fungible token can be individually divided into sub-parts (e.g., a sub-part of the non-fungible token may be an individual document of a collection of documents relating to the user). For example, the non-fungible token may be segmented into sub-sets of the whole (e.g., a document may be represented as a sub-set of all of the documents associated with a given user).

The NFT may be based on the DNA of the user associated. For example, the physical characteristics of a user (e.g., DNA, user metrics, and/or the like) may be converted into binary digits and processed using a hash function. The resulting hash may be used to verify user activity. For example, a user may provide one or more physical characteristics (e.g., in this embodiment, the physical characteristics may be the encryption key) that are processed using the hash function and then compared to the stored hash value created using the physical characteristics of the user.

Another example encryption method used herein may be a cipher chain encryption. Various types of cipher chain encryption may be used for the encryption. A cipher chain encryption includes a sequence of a fixed number of bits (e.g., 64 bits, 128 bits, 256 bits, etc.) that can have a single encryption key that is applied to the entire cipher chain (or block) to decrypt the chain. Cipher chain encryption may include creating an encryption key in order to access the document(s) associated with the user.

The encryption key may be created using access details, common secret passcodes (e.g., between government entities and the user), and/or the like. The bit size of the cipher chain may be formatted in an acceptable form (e.g., 256-bit encryption may be used to be consistent with other messages). The encryption key may include various information across the different alphanumerical characters. The encryption key may include alphanumerical characters that correspond to the access message, the institution name and/or location, one or more secret passcodes, and/or the like. For example, in an instance in which the encryption key is a 19-character key, the first nine characters may correspond to the access message, the next four characters may indicate the institution name and/or location, the next three characters may indicate a first secret passcode and the next three characters may indicate a second secret passcode.

Another example encryption method used herein may be a tensor encryption. As such, each of the passcodes are placed in a tensor (e.g., a three-dimensional cube or shape) in which the order matters. The tensor appears to be completely random until decrypted using the encryption key. The result of the tensor is an encryption key that typically includes a sequence of one or mores words (e.g., a sentence) in which the order of the words matter.

The different types of encryptions may also be used in combination with one another. For example, the document information may be encrypted using at least two of the NFT hash encryption, the cipher chain encryption, or the tensor encryption. The layer encryption (e.g., using multiple encryption methods) creates additional security. For example, the order of encryption is important for accurate decryption.

Referring now to Block 304 of FIG. 3, the method includes storing the one or more encrypted documents in a centralized storage device. After the documents are encrypted, the documents may be stored on a centralized storage device. The encrypted documents are only accessible with the correct encryption key(s) as discussed herein. The centralized storage device may be controlled by a third-party entity, such that the documents are not accessible by the financial entity until the encryption key(s) are provided. Additionally, multiple different requesting entities may be a part of the network, such that the documents can be retrieved by multiple entities from the centralized storage device without having to request the documents from the document sources multiple times. For example, in an instance in which a user has accounts at multiple financial entities, each entity can access or retrieve the documents from the centralized storage device.

Referring now to Block 306 of FIG. 3, the method includes decrypting the one or more documents based on the at least one encryption key. As discussed above, the encryption keys are created to decrypt the encrypted documents and usually provided to the user. The user may then provide the encryption key(s) to the system (e.g., either directly or by providing the encryption key(s) to an entity seeking to access the documents). The at least one encryption key is used to access one or more documents associated with the account associated with the user. The encryption key(s) may be used for a portion of the documents relating to the user (e.g., only one document may be needed to confirm the user residence and therefore only said document would be retrieved) or the encryption key(s) may be used for all of the documents relating to the user (e.g., the user may have a single encryption key or keys for all of the documents stored on the system).

Figure 4:
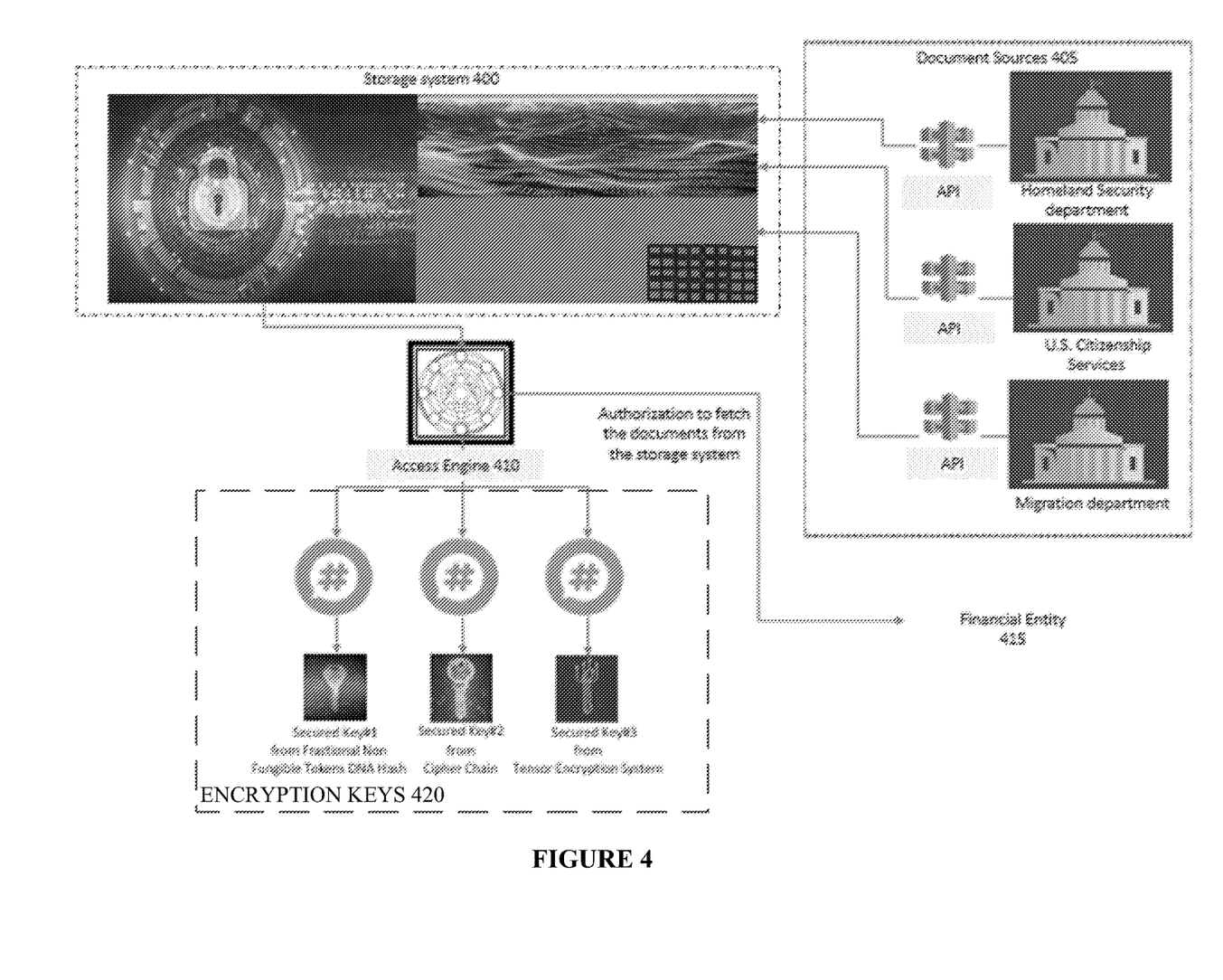
FIG. 4 illustrates an example environment for encrypting and decrypting documents for retrieval and sharing.

FIG. 4 illustrate process flow of an exemplary distributed computing environment for secure document retrieval and sharing using multistage encryption and authorization, in accordance with various embodiments of the disclosure. As discussed herein, the components shown in FIG. 4 may correspond to one or more components of the environment 100 shown in FIG. 1. For example, the storage system 400 may be a part or have the same or similar components to system 130, the access engine 410 may also have a processor and memory as the system 130. Each of the components may communicate over the network 110.

As shown, the storage system 400 is in communication with one or more document sources 405, which provide documents relating to one or more users. In the example discussed herein, the documents relate to user residence information and may be obtained from government entities (e.g., Homeland Security, U.S. Citizenship Services, Migration Services, and/or the like). The storage system 400 may receive the documents digitally (e.g., via the network 110). Upon receiving the documents from the one or more document sources, the storage system 400 is configured to encrypt the documents and store the documents (e.g., the documents may be stored in a memory device, such as a holographic storage device). Financial entities 415 (or any other entities that may seek to obtain the documents) may request to retrieve the documents from the storage system 400 via the access engine 410. The access engine determines whether the one or more encryption keys 420 provided by the user match the encryption keys for the one or more documents associated with the user.

The type of encryption and/or the number of encryption keys may be based on the level of security. For example, in the example shown in FIG. 4, the user provides three encryption keys, a first encryption key is for the fractional non-fungible token DNA hash encryption, the second encryption key is for the cipher chain encryption, and the third encryption key is for the tensor encryption. While the example illustrates three encryption types being used, any number of encryption types and/or encryption methods may be used in accordance with various embodiments discussed herein. Based on the encryption keys, the relevant document(s) relating to the user are decrypted and provided to the financial entity 415 for user residence verification. As such, the documents in the storage system 400 are secure and only provided to an entity in an instance in which each of the one or more encryption keys are provided correctly.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for secure document retrieval and sharing using multistage encryption and authorization, the system comprising:
    at least one non-transitory storage device; and
    at least one processing device coupled to the at least one non-transitory storage device, wherein the at least one processing device is configured to:
    receive a user location verification request for an account associated with a user, wherein the user location verification request is a request for one or more documents relating a user residence of the user;
    receive at least one encryption key for one or more documents associated with the user, wherein the one or more documents associated with the user relate to the user residence of the user, wherein the one or more documents are encrypted using at least two of a non-fungible token hash encryption, a cipher chain encryption, or a tensor encryption based on level of security for the one or more documents;
    cause a transmission of at least one encryption key relating to the user, wherein the at least one encryption key is used to access one or more documents associated with the account associated with the user;
    determine the user residence of the user based on the one or more documents obtained via the at least one encryption key relating to the user; and
    based on the user residence of the user, determine an account access level for the account associated with the user, wherein the account access level is a restriction of access in an instance in which the user residence is a restricted location.

2. The system of claim 1, wherein the restricted location is based on one or more sanctioned countries that are restricted from a network.

3. The system of claim 1, wherein the at least one encryption key is used to decrypt at least the one or more documents, wherein the one or more documents are encrypted using at least one of a non-fungible token hash encryption, a cipher chain encryption, or a tensor encryption.

4. The system of claim 1, wherein the one or more documents associated with the user relating to the user residence of the user are government-issued documents relating to user location.

5. The system of claim 1, wherein the user location verification request is created periodically for confirmation of the user residence, wherein the user residence is verified on a periodic basis.

6. The system of claim 1, wherein the at least one processing device is further configured to:
    encrypt the one or more documents associated with the user, wherein the encryption is based on the user associated with the given document; and
    store the one or more encrypted documents in a centralized storage.

7. A computer program product for secure document retrieval and sharing using multistage encryption and authorization, the computer program product comprising at least one non-transitory computer-readable medium having computer-readable program code portions embodied therein, the computer-readable program code portions comprising:
    an executable portion configured to receive a user location verification request for an account associated with a user, wherein the user location verification request is a request for one or more documents relating a user residence of the user;
    an executable portion configured to receive at least one encryption key for one or more documents associated with the user, wherein the one or more documents associated with the user relate to the user residence of the user, wherein the one or more documents are encrypted using at least two of a non-fungible token hash encryption, a cipher chain encryption, or a tensor encryption based on level of security for the one or more documents;

an executable portion configured to cause a transmission of at least one encryption key relating to the user, wherein the at least one encryption key is used to access one or more documents associated with the account associated with the user;

an executable portion configured to determine the user residence of the user based on the one or more documents obtained via the at least one encryption key relating to the user; and an executable portion configured to determine an account access level for the account associated with the user based on the user residence of the user, wherein the account access level is a restriction of access in an instance in which the user residence is a restricted location.

8. The computer program product of claim 7, wherein the restricted location is based on one or more sanctioned countries that are restricted from a network.

9. The computer program product of claim 7, wherein the at least one encryption key is used to decrypt at least the one or more documents, wherein the one or more documents are encrypted using at least one of a non-fungible token hash encryption, a cipher chain encryption, or a tensor encryption.

10. The computer program product of claim 7, wherein the one or more documents associated with the user relating to the user residence of the user are government-issued documents relating to user location.

11. The computer program product of claim 7, wherein the user location verification request is created periodically for confirmation of the user residence, wherein the user residence is verified on a periodic basis.

12. The computer program product of claim 7, wherein the computer program product further comprises:

an executable portion configured to encrypt the one or more documents associated with the user, wherein the encryption is based on the user associated with the given document; and an executable portion configured to store the one or more encrypted documents in a centralized storage.

13. A computer-implemented method for secure document retrieval and sharing using multistage encryption and authorization, the method comprising:

receiving a user location verification request for an account associated with a user, wherein the user location verification request is a request for one or more documents relating a user residence of the user;

receiving at least one encryption key for one or more documents associated with the user, wherein the one or more documents associated with the user relate to the user residence of the user, wherein the one or more documents are encrypted using at least two of a non-fungible token hash encryption, a cipher chain encryption, or a tensor encryption based on level of security for the one or more documents;

causing a transmission of at least one encryption key relating to the user, wherein the at least one encryption key is used to access one or more documents associated with the account associated with the user;

determining the user residence of the user based on the one or more documents obtained via the at least one encryption key relating to the user; and determining an account access level for the account associated with the user based on the user residence of the user, wherein the account access level is a restriction of access in an instance in which the user residence is a restricted location.

14. The method of claim 13, wherein the restricted location is based on one or more sanctioned countries that are restricted from a network.

15. The method of claim 13, wherein the at least one encryption key is used to decrypt at least the one or more documents, wherein the one or more documents are encrypted using at least one of a non-fungible token hash encryption, a cipher chain encryption, or a tensor encryption.

16. The method of claim 13, wherein the user location verification request is created periodically for confirmation of the user residence, wherein the user residence is verified on a periodic basis.

17. The method of claim 13, further comprising:

encrypting the one or more documents associated with the user, wherein the encryption is based on the user associated with the given document; and storing the one or more encrypted documents in a centralized storage.

* * * * *